United States Patent
Kishimoto

(10) Patent No.: US 8,031,965 B2
(45) Date of Patent: Oct. 4, 2011

(54) IMAGE PROCESSOR, COMPUTER READABLE MEDIUM STORING IMAGE PROCESSING PROGRAM, AND IMAGE PROCESSING METHOD

(75) Inventor: Yasunari Kishimoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1043 days.

(21) Appl. No.: 11/889,368

(22) Filed: Aug. 13, 2007

(65) Prior Publication Data

US 2008/0175505 A1 Jul. 24, 2008

(30) Foreign Application Priority Data

Aug. 21, 2006 (JP) ................ P2006-223903

(51) Int. Cl.
*G06K 9/40* (2006.01)
(52) U.S. Cl. ...................................... 382/274
(58) Field of Classification Search ............ 382/254
See application file for complete search history.

(56) References Cited

U.S. PATENT DOCUMENTS

| | | | | |
|---|---|---|---|---|
| 5,299,291 | A | 3/1994 | Ruetz | 395/109 |
| 5,416,890 | A | 5/1995 | Beretta | 395/131 |
| 5,438,649 | A | 8/1995 | Ruetz | 395/109 |
| 5,933,252 | A | 8/1999 | Emori et al. | 358/500 |
| 6,297,826 | B1 | 10/2001 | Semba et al. | 345/431 |
| 6,437,792 | B1 | 8/2002 | Ito et al. | 345/600 |
| 6,724,507 | B1 | 4/2004 | Ikegami et al. | 358/518 |
| 7,015,927 | B2 | 3/2006 | Matsushiro et al. | 345/600 |
| 2003/0012453 | A1* | 1/2003 | Kotlikov et al. | 382/275 |
| 2003/0016862 | A1 | 1/2003 | Ohga | 382/162 |
| 2004/0165771 | A1 | 8/2004 | Russell et al. | 382/167 |
| 2005/0275911 | A1* | 12/2005 | Yamada et al. | 358/518 |

FOREIGN PATENT DOCUMENTS

| | | |
|---|---|---|
| EP | 0 635 971 A2 | 1/1995 |
| EP | 1 022 897 A2 | 7/2000 |
| EP | 1 347 633 A2 | 9/2003 |
| JP | 6-233129 A | 8/1994 |
| JP | 7-32614 A | 2/1995 |
| JP | 11-69189 A | 3/1999 |

(Continued)

OTHER PUBLICATIONS

Noburo Ohta, "Color Engineering," Tokyo Denki University Press (1993), p. 137.

(Continued)

*Primary Examiner* — Brian Werner
*Assistant Examiner* — Nirav G Patel
(74) *Attorney, Agent, or Firm* — Morgan, Lewis & Bockius LLP

(57) ABSTRACT

An image processor includes a signal acquiring unit, a first converting unit, a signal specifying unit and a second converting unit. The signal acquiring unit acquires a signal in a color space having a perceptual property. The first converting unit converts the signal acquired by the signal acquiring unit into a first color signal in a color-mapping space having an equilightness-equihue plane. The signal specifying unit specifies a second color signal in the color-mapping color space corresponding to the first color signal, as a color-gamut mapping process. The second converting unit converts the second color signal specified by the signal specifying unit into a signal in a same color space as the color space to which the signal acquired by the signal acquiring unit belongs.

18 Claims, 2 Drawing Sheets

FOREIGN PATENT DOCUMENTS

| | | |
|---|---|---|
| JP | 11-313219 A | 11/1999 |
| JP | 2000-83177 A | 3/2000 |
| JP | 2000-278546 A | 10/2000 |
| JP | 3337697 B2 | 8/2002 |
| JP | 2002-281338 A | 9/2002 |
| JP | 2003-78776 A | 3/2003 |
| JP | 2003-274208 A | 9/2003 |
| JP | 2004-32140 A | 1/2004 |
| JP | 2004-104603 A | 4/2004 |
| JP | 2004-104604 A | 4/2004 |
| JP | 2004-104777 A | 4/2004 |
| JP | 2004-112114 | 4/2004 |
| JP | 2004-289810 A | 10/2004 |

OTHER PUBLICATIONS

C. Li and M.R. Luo, "A Uniform color space based upon CIECAM97s.," *Proc. SPIE*, vol. 4421, 9th Congress of the International Colour Association, Eds. (Jun. 2002).

Japanese office action for JP Patent Application 2006-223903.

* cited by examiner

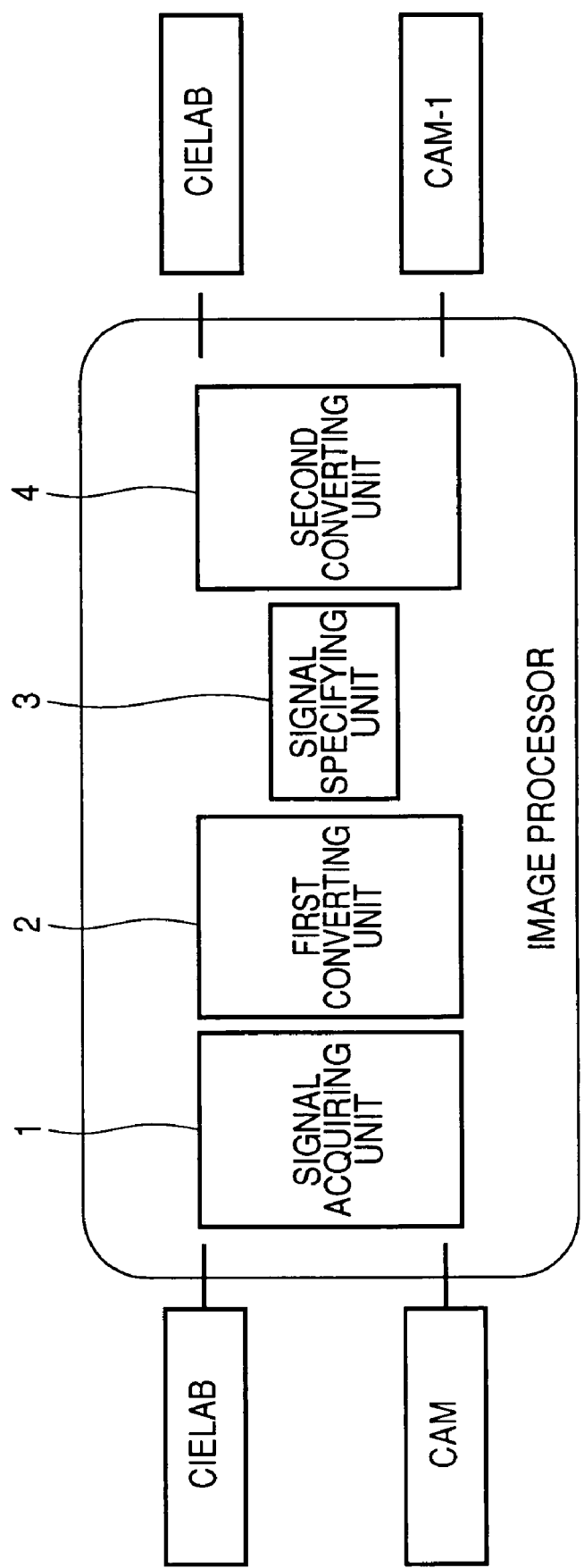

IMAGE PROCESSOR, COMPUTER READABLE MEDIUM STORING IMAGE PROCESSING PROGRAM, AND IMAGE PROCESSING METHOD

CROSS-REFERENCE TO RELATED APPLICATIONS

This application is based on and claims priority under 35 U.S.C. §119 from Japanese Patent Application No. 2006-223903 filed on Aug. 21, 2006.

BACKGROUND

1. Technical Field

The invention relates to an image processor, an image processing program, a computer readable medium storing the image processing program, an image processing method, a computer data signal embedded with the image processing program for performing a color-gamut mapping process to determine a corresponding reproduction color and for evaluating the reproduction color.

2. Related Art

In recent years, various devices have been in widespread use as a device for treating a color image. However, in the case of treating the same image data with different devices, in order to match device color spaces to each other, a color conversion process, particularly, a color-gamut mapping process is required. For example, a device such as a display monitor and a digital camera uses a device color space represented by RGB while a device such as a printer and a copier uses a device color space represented by YMCK.

In the case of matching the device color spaces to each other, although a color tristimulus value XYZ or a color stimulus specification LMS provided by CIE (International Commission Illumination) can be used as a color space for this process, it is general that any one of a CIELAB space and a CIECAM space (for example, any of JCh or $Ja_cb_c$) is used. In other words, there are two mechanisms as the general color-gamut mapping process. The former that uses the CIELAB (D50) space is a mechanism adopted by ICC (International Color Consortium) and has been widely spread. The latter that uses the CIECAM space is a mechanism suggested by CIE in order to solve some problems of the former.

SUMMARY

According to an aspect of the invention, an image processor includes a signal acquiring unit, a first converting unit, a signal specifying unit and a second converting unit. The signal acquiring unit acquires a signal in a color space having a perceptual property. The first converting unit converts the signal acquired by the signal acquiring unit into a first color signal in a color-mapping space having an equilightness-equihue plane. The signal specifying unit specifies a second color signal in the color-mapping color space corresponding to the first color signal, as a color-gamut mapping process. The second converting unit converts the second color signal specified by the signal specifying unit into a signal in a same color space as the color space to which the signal acquired by the signal acquiring unit belongs.

BRIEF DESCRIPTION OF THE DRAWINGS

Exemplary embodiments of the invention will be described below in detail with reference to the accompanying drawings, wherein:

FIG. 1 is a functional block diagram showing a schematic configuration example of an image processor according to an exemplary embodiment of the invention;

DETAILED DESCRIPTION

The color-gamut mapping process is a process for associating color coordinates in a first color reproduction area to color coordinates in a second color reproduction area in the same color space having perceptual properties such as lightness, chroma and hue. With regard to this color-gamut mapping process, it is not preferable that associated colors are changed depending on a work flow. Therefore, it is desired that any signal of any of two mechanisms, namely, CIELAB and CIECAM can be treated in the same way. For this, it may be conceived that a color conversion is performed to convert a signal in one of the mechanisms into a signal in the other mechanism and the color-gamut mapping is performed in a unified color space. However, in this case, it is necessary to consider the following points.

Figure 2A:
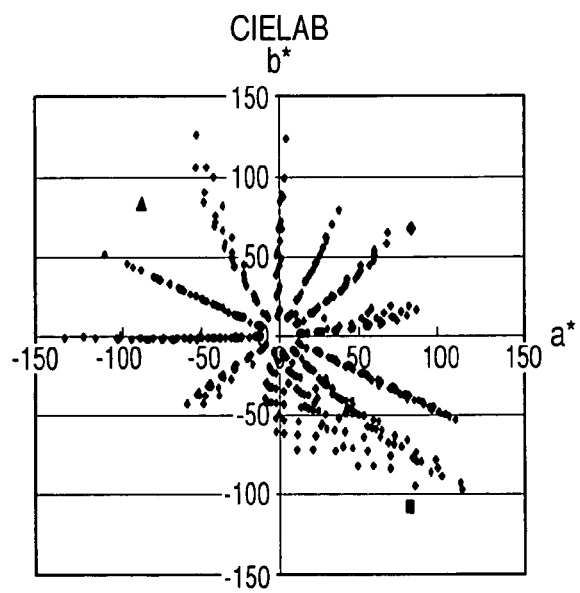
FIG. 2 is an explanatory view showing a basic data example in which lightness-chroma is curved.
Figure 2B:
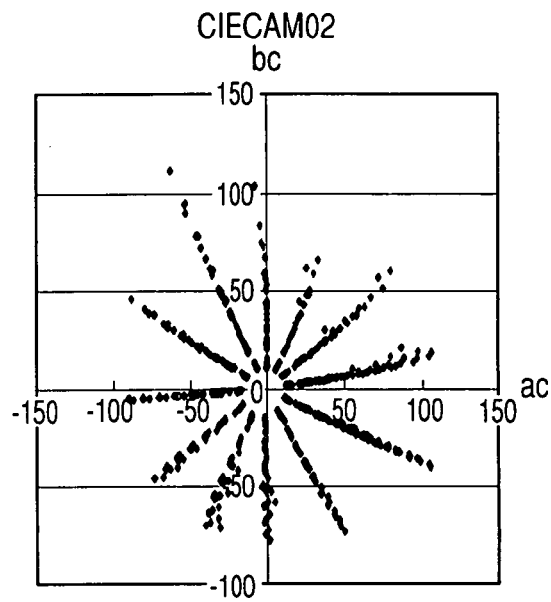
Figure 3:
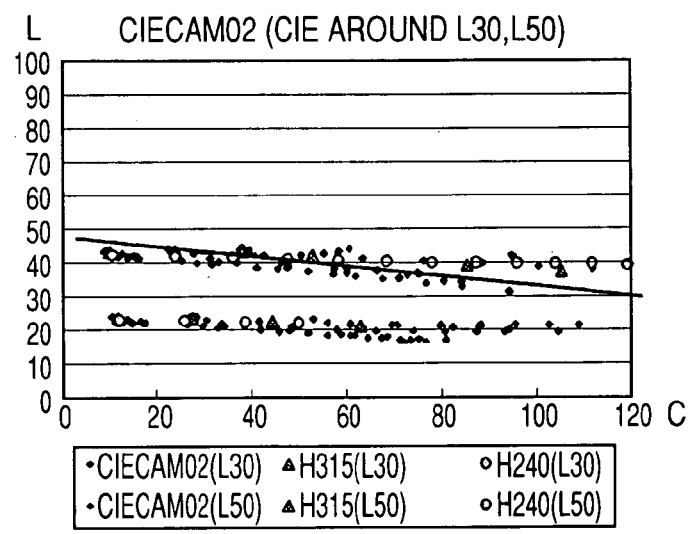
FIG. 3 is an explanatory view showing a basic data example in which an equihue line and an equilightness line are changed in accordance with color adaptation.

In the CIELAB (perceptual uniform color space), even if such a problem that hue is not uniform is solved with the equihue plane being focused on, it is not possible to solve such a problem that hue is changed in accordance with lightness and chroma. Specifically, there is a phenomenon referred to as a Helmholtz-Kohlrausch effect that increase of lightness is sensed as chroma increases, with regard to hues of blue, purple and magenta. In addition to this effect, for example, as shown in FIG. 2A, there is a case where lightness-chroma is curved. In addition, a problem that hue is changed in accordance with lightness occurs not only in the perceptual uniform color space but also in a color space using a color appearance model (CAM), for example, as shown in FIG. 2B. In addition, since many CIELAB use the D50 observation environment condition, a chromatic adaptation property for correcting a difference in observation environment condition is required in mapping from the RGB color space. In this case, in some color gamut, gradation continuity would be curved. In other words, a line connecting respective plotted points is curved or a crude density of the respective plotted points is varied, for example, as shown in FIG. 3. In other words, in the figure, there is such a problem that the line connecting the plot points inclines rightward and downward. If the CIECAM is generated by using the observation condition of an RGB image, it is expected that the influence is reduced by half. However, since the general work flow passes through CIELAB (D50) subjected to the color adaptation, such a problem arises that CIECAM is generated by using the observation condition of the CIELAB (D50). These two problems may be correlated with each other, and the line connecting the respective plot points may be changed. Further, as a problem that is not treated in the process which focuses on the equihue plane, preferable gray axis and gradation are obtained when an equihue line and an equilightness line (or the equihue plane and the uniform lightness plane) are changed depending on the observation environment condition of an input signal and an output signal. The CIECAM is good but is determined by experimentally verifying a corresponding reproduction color. Thus, there arises a problem that the observation condition influences on CIECAM and CIECAM is determined without considering gradation.

In addition, there is a problem that the perspective uniformity of the CIECAM is inferior to that of the CIELAB. In other words, the CIECAM is not a color space that is defined as a perceptual uniform color space. For example, the CIELAB and the CIECAM97s have lower degree of accuracy than the CIELAB if it is assumed that ratios of sizes of axes of two kinds of opponent color responses having information of chroma and hue (a red-green channel and a yellow-blue channel, for example, a and b) to a size of an axis of chroma are defined as 1:1. Also, it is preferable to change the CIECAM into a more perceptual color space. The uniformity of the color space that is discussed as a comprehensive color difference should be distinguished from a color difference and a color difference which is a target of a color-difference formula. Many color-difference formulas are defined in order to represent a difference not more than 3.0 or a difference less than 5.0 at most, if it is assumed that a perceptible minimum unit (JND) is 1.0. In other words, in the CIECAM, if a perceptual uniformity is required, some devices such as a process for changing ratios of two opponent color responses to lightness are required. Therefore, this problem cannot be solved by the discussion about the color difference. This may be an assessment function for determining a mapping direction.

Hereinafter, an image processor, an image processing program, a computer readable medium storing the image processing program, a computer data signal embedded wit the image processing program, and an image processing method according to exemplary embodiments of the invention will be described with reference to the drawings.

At first, the schematic constitution of the image processor will be described. For the purpose of performing mapping, color evaluation and image evaluation, the CIELAB space and the CIECAM20 space are not sufficient in accuracy. Therefore, The image processor to be described here can realize a color-gamut mapping process with high accuracy by constructing a color-mapping space.

FIG. 1 is a functional block diagram showing a schematic configuration example of an image processor. As shown in FIG. 1, the image processor according to the exemplary embodiment includes a signal acquiring unit 1, a first converting unit 2, a signal specifying unit 3 and a second converting unit 4.

The signal acquiring unit 1 acquires a signal of a color space having a perceptual property. The color space having the perceptual property means a color space that can be perceptually treated depending on lightness, chroma and hue. Accordingly, the input signal acquired by the signal acquiring unit 1 may be one in a CIELAB (a perceptual uniform color space) or one in a CIECAM02 (a color appearance model). In addition, it is assumed that the signal acquiring unit 1 receives observation environment condition information for an input signal together with reception of the input signal. The observation environment condition information specifies an observation environment condition (for example, the D65 environment or the D50 environment) under which the input signal is generated.

The first converting unit 2 converts the signal acquired by the signal acquiring unit 1 into a first color signal in a color-mapping space having an equilightness-equihue plane. Although the details of this color-mapping space will be described later, at least a relationship between subjective hue and lightness is maintained in the color-mapping space. It is not necessarily to configure the color-mapping space that is perceptually uniform. For example, in some cases, if at least the order of a magnitude relation in chroma is maintained, no big problem arises.

The signal specifying unit 3 specifies a second color signal in the color-mapping color space corresponding to the first color signal, as a color-gamut mapping process. That is, the signal specifying unit 3 performs the so-called color-gamut mapping process.

The second converting unit 4 converts the second color signal specified by the signal specifying unit 3 into a signal in the same color space as the color space to which the signal acquired by the signal acquiring unit 1 belongs. Thereby, the signal of the CIELAB or the CIEAM02 will be output from the second converting unit 4.

Here, the color-mapping space will be described. The color-mapping space may configure a space having an equilightness-equihue plane. The "space having an equilightness-equihue plane" is a space in which curvature in the CIELAB space or the CIECAM space is corrected. For example, a plane formed of the same lightness is substantially a two-dimensional plane and a plane formed of the same hue is substantially a two-dimensional plane. It is considered that, if the color space of the signal acquired by the signal acquiring unit 1 is not in the CIECAM02 but in the CIELAB, a space having the equilightness-equihue plane is configured by converting the color space of this acquired signal into the CIECAM02 on the basis of observation environment condition information for this acquired signal. Further, it is considered that the space having the equilightness-equihue plane is configured by changing to 1:1, a ratio of (i) two kinds of opposed color responses having information of chroma and hue in the color-mapping space to (ii) lightness in the color-mapping space. Here, the "opposed color response" does not mean a color response in optic nerve, but is a term to conveniently handle the following concept. The "opposed color response" means converting into an orthogonal coordinate system, two axes of chroma and hue that may be sometimes represented by a polar coordinate system. Therefore, a ratio of 1:1 may be a ratio of lightness to chroma.

In the respective units 1 to 4, it is considered that a function as a computer in the image processor is realized by carrying out a predetermined program. In other words, it is assumed that the predetermined program has been installed in the image processor according to the exemplary embodiment in advance. However, in this case, the predetermined program maybe stored in a recording medium that can be read by a computer prior to installation into the image processor or it may be distributed via a wired or wireless communication means. In other words, these respective units 1 to 4 may be realized also by the image program that can be installed in the image processor.

Next, an example of the processing operation in the image processor that is configured as described above (including the case that the function is realized also by the image processing program), namely, an image processing method according to the exemplary embodiment will be described.

Upon reception of an input signal, the image processor that is configured as described above converts that input signal into a signal in the color-mapping space and then performs mapping therefore in accordance with an intension of a user (a reproduction mode which is provided in rendering intent and a driver). Then, the image processor converts the resultant signal in the mapping space to a signal in the same color space as the color space to which the input signal belongs, and outputs this signal. In the color-mapping space, not only the mapping processing but also various color process and color evaluation may be carried out.

The color-mapping space constructs the space having the equilightness-equihue plane. It is considered that such a color-mapping space is generated as follows.

At first, even if an input signal is any one, the input color signal is converted through one in the CIECAM02 model. For example, if the input signal belongs to the CIELAB, this input signal is converted into a signal in the CIECAM02. However, if the input signal originally belongs to the CIECAM02, conversion is not necessary.

The conversion may be carried out using a publicly-known method. However, it is assumed that the conversion process is carried out so as to meet an observation environment condition that is specified by observation environment condition information for the input signal, on the basis of the observation environment condition information.

Thereby, even if the input signal is any signal, namely, the signal is either of two mechanisms, i.e., the CIELAB and the CIECAM, a Jab ($Ja_cb_c$ that is calculated from JCh) signal in the CIECAM02 is obtained as a signal acquired through the signal acquiring unit 1. In addition, in the CIELAB (D50) that can be obtained form an ICC profile, an observation environment condition as a PCS (Profile Connection Space) exists. That is, two observation conditions including the original observation environment condition exist in total. If the user does not recognize the object of this exemplary embodiment, these two observation conditions may be treated as the same condition, which result in enhancement of convenience. Therefore, the original observation environment condition may be used. However, if a default observation environment condition to be used when no observation environment condition is obtained is not set, the observation environment condition from the PCS may be set as default one.

On the other hand, in generation of the color-mapping space, for example, a state of equihue in the CIELAB and in CIECAM02 as shown in FIG. 2 and a state of curvature of lightness-hue are specified in advance. Further, a state of curvature of lightness-chroma as shown in FIG. 3 is specified in advance.

Here, FIG. 2A shows data obtained by preparing (i) a data group of CIEXYZ values (for each of 12 types of hues) which have the same hue and which are found experimentally and (ii) a data group of CIEXYZ values (for each of plural pieces of lightness) having the same lightness and converting the respective data groups into values in CIELAB(D65) using a definitional equation.

FIG. 2B shows data obtained by converting the data groups into values in CIECAM02 using a definitional equation.

FIG. 3 shows an L-C plane. A data group (hue is 315° or 240°) in CIEXYZ whose lightness corresponds to L*30 or L*50 is converted into CIELAB(D65) and CIECAM02 using the definitional equation, and is shown in FIG. 3.

Then, on the basis of these specification results, data for correcting the curvature is generated, and the signal that is obtained through the signal acquiring unit 1 is corrected with the correction data. If the technique disclosed in the patent document 12 is used to generate the color space from the correction curve, it becomes possible to correct the color space locally. By this correction, for this signal, the ratios of the two opponent colors (for example, a, and b c) to lightness (for example, J) are adjusted.

Further, a method of adjusting a comprehensive uniformity, determines $K_L$ so that a result of the following relational expression becomes minimum for a psychophysical data group, and sets $K_L$ as ratios of lightness in the color-mapping space to a first opposed color and a second opposed color. $K_L$ may be determined in advance or may be evaluated and generated before the processing is applied.

$$\Delta E = A \times \sqrt{\left(\frac{\Delta V_1}{K_L}\right)^2 + \Delta V_2^2 + \Delta V_3^2} \quad (1)$$

In this expression (1), $\Delta E$ represents a comprehensive color difference, V1 represents lightness, V2 and V3 represent opposed colors. Further, $K_L$ is an adjustment parameter of a ratio and A is a coefficient for normalizing $\Delta E$. $\Delta E$ is an evaluated value for collectively treating a perceptible minimum unit (JND). There is no problem if this value $\Delta E$ is one time or ten times, and this value $\Delta E$ is adjusted by a coefficient A.

Further, as another representation, the following expression is established.

$$Jab \rightarrow J \frac{a}{k} \frac{b}{k} \quad (2)$$
$$(k = 0.5 \sim 0.8)$$

By performing these adjustments, the signal acquired through the signal acquiring unit 1 is changed so that the ratio between two kinds of opposed color responses having the information of chroma and hue and lightness is equal to 1:1. Then, by this change, the curvature as shown in FIG. 2 is corrected, which results in the fact that the curvature is corrected so that variation of a crude density is uniformed.

In other words, according to the exemplary embodiment, if a color space to which the signal acquired by the signal acquiring unit 1 belongs to is not the CIECAM02, the color space of this signal is converted into the CIECAM02 on the basis of the observation environment condition information which specifies a condition under which this signal is generated. Furthermore, by changing the signal subjected to the conversion so that ratios between (i) the two kinds of opposed color responses having the information of chroma and hue and (ii) lightness becomes equal to 1:1, the color-mapping space having the equilightness-equihue plane is generated. By carrying out the color-gamut mapping in the color-mapping space that is generated in this way, it is possible to obtain associated colors with high accuracy.

In the above description, an example where the signal uses Jab of the CIECAM02 is explained. However, the invention is not limited to thereto. For example, the invention may be applied to another color space having a perceptive property indicating lightness and two kinds of opposed color responses (a red—green channel and a yellow—blue channel) or indicating lightness, chroma, and hue in the same way.

As a problem that is not treated by the process which focuses on an equihue, there is a problem that an equihue line and an equilightness line (or the equihue plane and the equilightness plane) and an achromatic axis (a gray axis) are changed depending on the observation environment condition for the input signal and the output signal. With respect to this problem, it is considered that the following processing operation is carried out.

For example, when associated colors are changed in accordance with user's instruction and/or user's intention, an output reproduction color is obtained while a property of the input reproduction color is reserved. Specifically, if there is a means for preserving a color relation that can be classified into categories with giving an importance to a discrimination of a color or if it is demanded to preserve continuity of plural input colors and gradation property of the plural input colors, there are various intensions and various ways of reflections. Here, the explanation will be given on the gradation property.

When a gradation property of input signals in the RGB space is focused on, elementary colors such as R, G, and B and gray of the equal quantity RGB are represented by a line in the RGB space that is a device space. However, in the CIECAM02 space and the CIELAB space, it is not necessary that this line is a straight line but this line would be a curve or color coordinates does not exist uniformly on a line segment.

As one of the processing operational examples for treating this point, it is considered that one or more gradation curve provided with arbitrary gradation property in consideration of the input environment condition is generated and this curve is set to an output gradation curve with the gradation curve being reserved (an associated color is assigned on the curve). In other words, by using any of (i) the equihue line and the equilightness line that are set for the both of the observation environment condition information assumed for the input signal and the observation environment condition information assumed for the output signal and (ii) the equihue line and the equilightness line that are set for the observation environment condition information that is registered in advance, a color-mapping space having the equilightness-equihue plane is generated through the correction process which uses the equihue line and the equilightness line. By carrying out the color-gamut mapping in the color-mapping space thus generated, it is possible to obtain an associated color having the gradation property.

In addition, as another processing operation example, one or more line segments equivalent to an equihue and an equilightness constructing a color space of an input signal are generated, and these line segments are converted into the color-mapping space. Thereby, the color-mapping space is configured by plural curves. Therefore, by complementing these plural line segments, it is possible to generate a new color-mapping space having the property of this color-mapping space and a property of the color space of the input signal. Then, it is considered that associated colors having a gradation property are obtained by carrying out the color-gamut mapping in this new color-mapping space. In other words, the correction process using the equihue line and the equilightness line that are set in advance for each observation environment condition information may use (i) the equihue line and the equilightness line that are set for the default observation environment condition information, (ii) the equihue line and the equilightness line that are set for the observation environment condition information assumed for the output signal, or (iii) the equihue line and the equilightness line that are registered in advance without using any of the equihue line and the equilightness line that are set for the both of the observation environment condition information assumed for the input signal and the observation environment condition information assumed for the output signal or the equihue line and the equilightness line that are set for the observation environment condition information that has been registered in advance.

As described above, according to the image processor, the image processing program, and the image processing method of the exemplary embodiment, by using the color-mapping space having the general versatility, it is possible to simply obtain the color-gamut mapping with high accuracy and this makes it possible to obtain a desired reproduction color. In addition, the exemplary embodiment can be used not only for the color-gamut mapping but also for a work space for analysis, evaluation, and correction such as the gradation sequence processing and an image noise correction processing or the like.

It is noted that the invention is not limited to the exemplary embodiment. One skilled in the art would appreciate that various modifications can be made thereto without departing from the scope thereof.

For example, it may be considered that the process for correcting the curvature may be changed in accordance with user's intent. In this case, it is desirable that a mechanism for expressly instructing if the inside of the color gamut is changed or not with respect to a gradation of, for example, a graphic image or the like is constructed.

What is claimed is:

1. An image processor comprising:
a signal acquiring unit that acquires a signal in a color space having a perceptual property;
a first converting unit that converts the signal acquired by the signal acquiring unit into a first color signal in a color-mapping space having an equilightness-equihue plane;
a signal specifying unit that specifies a second color signal in the color-mapping color space corresponding to the first color signal, as a color-gamut mapping process; and
a second converting unit that converts the second color signal specified by the signal specifying unit into a signal in a same color space as the color space to which the signal acquired by the signal acquiring unit belongs,
wherein the color-mapping space is configured by changing a ratio of (i) two kinds of opponent color responses having information of chroma and hue in the color-mapping space to (ii) lightness to 1:1.

2. The image processor according to claim 1, wherein the color-mapping space is generated through a correction process that uses an equihue line and an equilightness line which are set for each observation environment condition information that specifies a condition under which the signal acquired by the signal acquiring unit is generated.

3. The image processor according to claim 2, wherein the equihue line and the equilightness line are set for both of (i) observation environment condition information assumed for the signal acquired by the signal acquiring unit and (ii) observation environment condition information assumed for the signal into which the second color signal is converted by the second converting unit, or for observation environment condition information that is registered in advance.

4. The image processor according to claim 2, wherein the equihue line and the equilightness line are set for default observation environment condition information, for observation environment condition information assumed for the signal into which the second color signal is converted by the second converting unit, or for observation environment condition information that is registered in advance.

5. The image processor according to claim 1, wherein the color-mapping space is generated through a correction process that uses an equihue line and an equilightness line, which are set for each observation environment condition information.

6. The image processor according to claim 5, wherein the equihue line and the equilightness line are set for both of (i) observation environment condition information assumed for the signal acquired by the signal acquiring unit and (ii) observation environment condition information assumed for the signal into which the second color signal is converted by the second converting unit, or for observation environment condition information that is registered in advance.

7. The image processor according to claim 5, wherein the equihue line and the equilightness line are set for default observation environment condition information, for observation environment condition information assumed for the signal into which the second color signal is converted by the second converting unit, or for observation environment condition information that is registered in advance.

8. The image processor according to claim 1, wherein the equihue line and the equilightness line are set for both of (i) observation environment condition information assumed for the signal acquired by the signal acquiring unit and (ii) observation environment condition information assumed for the signal into which the second color signal is converted by the second converting unit, or for observation environment condition information that is registered in advance.

9. The image processor according to claim 8, wherein the equihue line and the equilightness line are set for default observation environment condition information, for observation environment condition information assumed for the signal into which the second color signal is converted by the second converting unit, or for observation environment condition information that is registered in advance.

10. The image processor according to claim 1, wherein the color-mapping space is configured so that a perceptible minimum unit in two kinds of opponent color responses having information of chroma and hue in the color-mapping space is identical with a perceptible minimum unit in lightness.

11. An image processor comprising:
a signal acquiring unit that acquires a signal in a color space having a perceptual property;
a first converting unit that converts the signal acquired by the signal acquiring unit into a first color signal in a color-mapping space having an equilightness-equihue plane;
a signal specifying unit that specifies a second color signal in the color-mapping color space corresponding to the first color signal, as a color-gamut mapping process; and
a second converting unit that converts the second color signal specified by the signal specifying unit into a signal in a same color space as the color space to which the signal acquired by the signal acquiring unit belongs,
wherein if the color space to which the signal acquired by the signal acquiring unit is not a space of a color appearance model, the first converting unit converts the signal acquired by the signal acquiring unit into in a signal in the space of the color appearance model based on observation environment condition information that specifies a condition under which the signal acquired by the signal acquiring unit is generated, and converts the signal in the space of the color appearance model into the first color signal, and
and the color-mapping space is configured by changing a ratio of (i) two kinds of opponent color responses having information of chroma and hue in the color-mapping space to (ii) lightness to 1:1.

12. The image processor according to claim 11, wherein the color-mapping space is generated through a correction process that uses an equihue line and an equilightness line, which are set for each observation environment condition information.

13. The image processor according to claim 12, wherein the equihue line and the equilightness line are set for both of (i) observation environment condition information assumed for the signal acquired by the signal acquiring unit and (ii) observation environment condition information assumed for the signal into which the second color signal is converted by the second converting unit, or for observation environment condition information that is registered in advance.

14. The image processor according to claim 12, wherein the equihue line and the equilightness line are set for default observation environment condition information, for observation environment condition information assumed for the signal into which the second color signal is converted by the second converting unit, or for observation environment condition information that is registered in advance.

15. The image processor according to claim 11, wherein the color-mapping space is generated through a correction process that uses an equihue line and an equilightness line, which are set for each observation environment condition information.

16. The image processor according to claim 11, wherein the color-mapping space is configured so that a perceptible minimum unit in two kinds of opponent color responses having information of chroma and hue in the color-mapping space is identical with a perceptible minimum unit in lightness.

17. An image processing method comprising:
acquiring a signal in a color space having a perceptual property;
converting the acquired signal into a first color signal in a color-mapping space having an equilightness-equihue plane;
specifying a second color signal in the color-mapping color space corresponding to the first color signal, as a color-gamut mapping process; and
converting the specified second color signal into a signal in a same color space as the color space to which the acquired signal belongs,
wherein the color-mapping space is configured by changing a ratio of (i) two kinds of opponent color responses having information of chroma and hue in the color-mapping space to (ii) lightness to 1:1.

18. A computer readable non-transitory medium storing a program causing a computer to execute image processing, the image processing comprising:
acquiring a signal in a color space having a perceptual property;
converting the acquired signal into a first color signal in a color-mapping space having an equilightness-equihue plane;
specifying a second color signal in the color-mapping color space corresponding to the first color signal, as a color-gamut mapping process; and
converting the specified second color signal into a signal in a same color space as the color space to which the acquired signal belongs,
wherein the color-mapping space is configured by changing a ratio of (i) two kinds of opponent color responses having information of chroma and hue in the color-mapping space to (ii) lightness to 1:1.

* * * * *